(12) United States Patent
Kitagawa et al.

(10) Patent No.: US 7,487,038 B2
(45) Date of Patent: Feb. 3, 2009

(54) NAVIGATION DEVICE

(75) Inventors: Eiji Kitagawa, Kawasaki (JP);
Toshiyuki Fukuoka, Kawasaki (JP);
Kyouko Okuyama, Kawasaki (JP);
Ryosuke Miyata, Kawasaki (JP);
Takuro Ikeda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 223 days.

(21) Appl. No.: 11/363,210

(22) Filed: Feb. 28, 2006

(65) Prior Publication Data
US 2007/0124058 A1      May 31, 2007

(30) Foreign Application Priority Data
Nov. 28, 2005   (JP) ............................. 2005-342022

(51) Int. Cl.
G01C 21/00   (2006.01)
G01C 21/28   (2006.01)
G01C 21/36   (2006.01)
G06F 17/00   (2006.01)

(52) U.S. Cl. .................. 701/202; 701/208; 340/995.12; 340/995.18

(58) Field of Classification Search ...................... 701/1, 701/36, 200, 201, 202, 204, 207, 208, 209, 701/210, 211, 300, 206; 340/988, 995.1, 340/995.12, 995.14, 995.16, 995.18, 995.27, 340/990, 995.19
See application file for complete search history.

(56) References Cited

U.S. PATENT DOCUMENTS

| | | | |
|---|---|---|---|
| 6,321,158 B1 * | 11/2001 | DeLorme et al. | 701/201 |
| 6,401,029 B1 * | 6/2002 | Kubota et al. | 701/201 |
| 6,732,047 B1 * | 5/2004 | de Silva | 701/209 |
| 6,829,532 B2 * | 12/2004 | Obradovich et al. | 701/207 |
| 6,842,693 B2 * | 1/2005 | Nagamune | 701/202 |
| 6,937,934 B2 * | 8/2005 | Kuroda et al. | 701/202 |
| 2004/0243430 A1 | 12/2004 | Horstemeyer | |

FOREIGN PATENT DOCUMENTS

| | | |
|---|---|---|
| EP | 0 399 520 | 11/1990 |
| EP | 1 587 249 | 10/2005 |
| JP | 2002-107174 | 4/2002 |
| WO | 02/17141 | 2/2002 |
| WO | 03/063521 | 7/2003 |

OTHER PUBLICATIONS

European Search Report dated Apr. 11, 2007 issued with respect to the corresponding European Patent Application No. 06251083.9-2213.

* cited by examiner

*Primary Examiner*—Jack W Keith
*Assistant Examiner*—Edward Pipala
(74) *Attorney, Agent, or Firm*—Staas & Halsey LLP (57) ABSTRACT

A navigation device includes a data transmission-reception portion for performing data transmission and reception with a portable terminal, an address list cooperation portion for receiving address list data, a schedule cooperation portion for receiving and managing schedule data, a candidate location specifying information recording portion for searching and extracting information for specifying a location corresponding to one schedule item from the address list data concerning a schedule indicated in schedule data to record the extracted information, a position specifying information obtaining portion for obtaining position specifying information for specifying a position on a map corresponding to each piece of candidate location specifying information, a selecting portion for selecting one position specifying information from position specifying information, and a path managing portion for determining a position of each destination on the path in accordance with the selected position specifying information to manage the path information.

11 Claims, 12 Drawing Sheets

| NAME | ADDRESS | TEL. NUMBER | POSTCODE (ZIP CODE) | MEMO |
|---|---|---|---|---|
| ⋮ | ⋮ | ⋮ | ⋮ | ⋮ |
| YAMADA ○○ | ○○, UKYO-KU, KYOTO | ○○○-○○○○ | 000-0000 | KANSAI BRANCH |
| ⋮ | ⋮ | ⋮ | ⋮ | |
| WATANABE ○○ | ○○, KITA-KU, OSAKA | ○○○-○○○○ | 000-0000 | |
| WATANABE △△ | ○○, CHUO-KU, KOBE | ○○○-○○○○ | 000-0000 | |
| ⋮ | ⋮ | ⋮ | ⋮ | ⋮ |

| DATE | TIME | LOCATION | CONTACT | CONTENTS |
|---|---|---|---|---|
| 10/1 | 9:00<br>11:00<br>14:30 | AA COMPANY IN OSAKA<br>MR. OR MS. WATANABE<br>BB COMPANY | MR. OR MS. aa<br>KANSAI<br>MATERIAL SECTION | MEETING<br>DELIVERY<br>MEETING |
| 10/2 | 10:20<br>13:30 | CC COMPANY | | GREETING |

FIG. 5

KTL

| No | CANDIDATE LOCATION |
|---|---|
| 1 | WATANABE ○○ |
| 2 | WATANABE △△ |
| 3 | YAMADA ○○ |
| 4 | |

FIG. 6

TTL

| No | CANDIDATE LOCATION | EAST LONGITUDE | NORTH LATITUDE |
|---|---|---|---|
| 1 | WATANABE ○○ | ○○○.○ | ○○.○ |
| 2 | WATANABE △△ | ○○○.○ | ○○.○ |
| 3 | YAMADA ○○ | ○○○.○ | ○○.○ |
| 4 | | | |

FIG. 7

TSL

| No | DESTINATION | EAST LONGITUDE | NORTH LATITUDE |
|---|---|---|---|
| 1 | AA COMPANY | ○○○.○ | ○○.○ |
| 2 | MR. OR MS. WATANABE | ○○○.○ | ○○.○ |
| 3 | BB COMPANY | ○○○.○ | ○○.○ |
| 4 | | | |

NAVIGATION DEVICE

BACKGROUND OF THE INVENTION

1. Field of the Invention

The present invention relates to a navigation device that is mounted on an automobile or the like and is capable of managing path information including a destination and locations on a path. In particular, the present invention relates to a navigation device that is used for cooperating with a portable terminal such as a cellular phone or a PDA.

2. Description of the Prior Art

Conventionally, a navigation device is used for showing paths or roads to a user who is a car driver. When the user of the navigation device for a car designates one or more destinations (hereinafter, "destination" includes a location on a path since they have a similar meaning,) for setting path information, the user is usually required specific knowledge about the destination such as an address or a telephone number. If the user who is driving a car knows the destination well, it is not so difficult to do such setting in the car. However, there are many cases where the user has to set a location as a destination that is not familiar to the user because of the nature of the navigation device for a car. Therefore, in many cases, the user has to prepare information about a destination and take a memo of the information into a car. This is burdensome.

For this reason, it is proposed to utilize cooperation between a portable terminal such as a cellular phone or a PDA and the navigation device for a car so that schedule information or address information registered in a schedule (a schedule book) or an address list (an address book) of the portable terminal can be used for setting a destination or searching an optimal path by the navigation device for a car (see Japanese unexamined patent publication No. 2002-107174).

According to the above-mentioned patent publication, the navigation device for a car can specify a destination position for setting the destination or the location on a path by using information that indicates a destination name such as a person's name or a location name listed in the schedule information of the portable terminal and information for specifying the destination position such as a location, a postcode (ZIP code), an address or a telephone number listed in the address book of the portable terminal, for example.

However, in order to set the destination or the like correctly by the above-mentioned method, the destination must be specified as a single one by the destination name such as a person's name or a location name. If there is a plurality of names that are the same in the address book, a plurality pieces of information that specifies the destination position may be obtained. In this case, the destination cannot be fixed. As a result, a desired result cannot be obtained, and the navigation device for a car cannot work properly. Furthermore, if the address book does not include information for specifying the destination position, a desired result cannot be obtained and the navigation device cannot work properly, either.

In addition, the conventional device such as the device described in the above-mentioned patent publication uses information of the portable terminal for setting a destination that is limited to an address list and a schedule book. Therefore, even if the portable terminal is provided with an additional service that is capable of setting a destination by cooperating with the navigation device for a car besides them, it is difficult to use the service.

SUMMARY OF THE INVENTION

An object of the present invention is to provide a navigation device that is capable of determining each destination included in a path and managing path information even if there is a plurality pieces of information for specifying a destination position.

A device according to the present invention is a navigation device that is capable of managing path information. The device includes a data transmission-reception portion for sending and receiving data with a portable terminal; an address list cooperation portion for receiving address list data from the portable terminal and managing the same; a schedule cooperation portion for receiving schedule data from the portable terminal and managing the same; a candidate location specifying information recording portion for searching and extracting information for specifying a location that corresponds to one schedule item from the address list data concerning a schedule indicated in the schedule data and recording the extracted one or more pieces of information as candidate location specifying information; a position specifying information obtaining portion for obtaining information that specifies a position of a destination or a location on a path that corresponds to each piece of the candidate location specifying information as position specifying information; a selecting portion for selecting one piece of position specifying information from one or more pieces of position specifying information; and a path managing portion for determining the position of the destination or the location on the path in accordance with the selected position specifying information and managing the path information. Here, the path information includes one or more destinations, and at least positions of the destinations and a passing order of the positions are recorded.

Preferably, the navigation device further includes a position information modifying portion for modifying the position information of each destination that is managed by the path managing portion in accordance with position specifying information that was not selected by the selecting portion.

In addition, the navigation device further includes a user setting portion for modifying the position information of each destination that is managed by the path managing portion in accordance with the position specifying information that complies a setting input by a user.

In addition, the selecting portion calculates a distance between a current position and each position in accordance with each piece of position specifying information and selects position specifying information having the calculated distance that is the smallest.

In addition, the selecting portion performs conversation with a user using voice about each piece of position specifying information and selects position specifying information in accordance with contents of the conversation.

In addition, the path managing portion deletes the path information on the navigation device side when the portable terminal is disconnected.

According to the present invention, it is possible to determine a position of each destination of a path and generate path

DESCRIPTION OF THE PREFERRED EMBODIMENTS

Hereinafter, the present invention will be explained more in detail with reference to embodiments and drawings.

Figure 1:
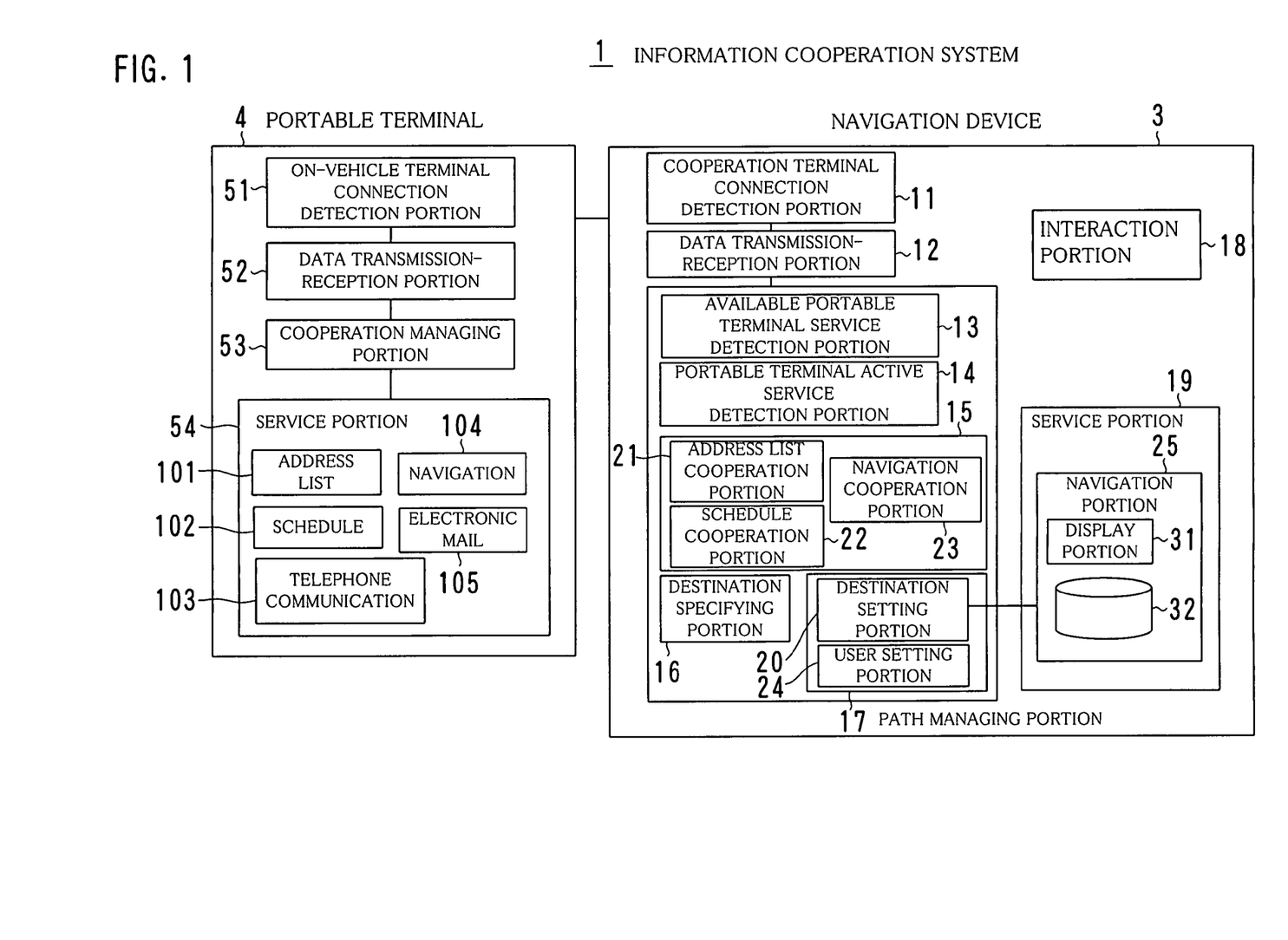
FIG. 1 is a block diagram showing a functional structure of an information cooperation system according to the present invention.
Figure 2:
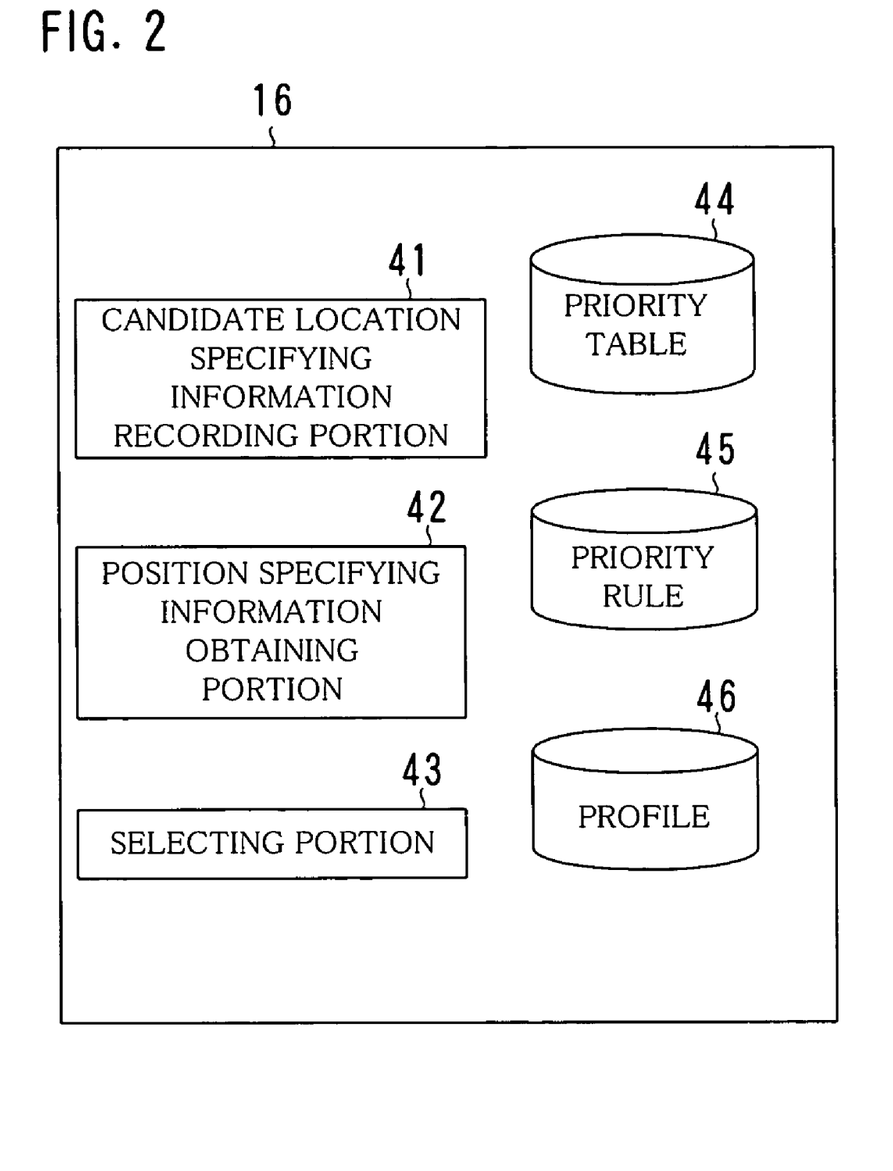
FIG. 2 is a block diagram showing a functional structure of a destination specifying portion.

FIG. 1 is a block diagram showing a functional structure of an information cooperation system 1 including a navigation device 3 according to the present invention, and FIG. 2 is a block diagram showing a functional structure of a destination specifying portion 16.

As shown in FIG. 1, the information cooperation system 1 includes the navigation device 3 and a portable terminal 4.

The navigation device 3 is installed in a periphery of a driver seat or the like in an automobile, and it displays its position or a destination on a map displayed on a screen in accordance with position information obtained by utilizing the GPS. The navigation device 3 shows a path to a user in accordance with a set path. Such a navigation function itself is known well conventionally as a navigation system for a car.

The portable terminal 4 is a terminal device having a data processing function and a communication function such as a cellular phone, a PDA, a notebook computer or a smart phone. Here, a case where the portable terminal 4 is a cellular phone will be explained mainly.

The navigation device 3 and the portable terminal 4 can perform their functions independently of each other. However, it is possible that they communicate with each other so that more advanced function can be provided to the user. This will be explained in more detail below.

As shown in FIG. 1, the navigation device 3 includes a cooperation terminal connection detection portion 11, a data transmission-reception portion 12, an available portable terminal service detection portion 13, a portable terminal active service detection portion 14, a cooperation managing portion 15, a destination specifying portion 16, a path managing portion 17, an interaction portion 18 and a service portion 19.

The cooperation terminal connection detection portion 11 detects whether or not the navigation device 3 is connected to the portable terminal 4. The navigation device 3 can be connected to the portable terminal 4 via a wireless communication such as Bluetooth, an infrared data communication or a wireless LAN, or a cable communication using a cable connection.

The data transmission-reception portion 12 performs data communication with the portable terminal 4 after the communication is established. If Bluetooth is used for the communication, a standard protocol such as a synchronization profile or a generic object exchange profile is used so as to send and receive various data including an address list and a schedule list. In this way, transmission and reception of data can be performed without depending on a type or a manufacturer of the device on the other end of communication.

The available portable terminal service detection portion 13 detects a service that can be used by the navigation device 3 among services that are equipped with the portable terminal 4.

The portable terminal active service detection portion 14 detects a service that is currently performed on the portable terminal 4. This service is selected and started by the user at the portable terminal 4, and it is managed by the portable terminal 4. When the portable terminal 4 is performing a navigation operation, for example, the portable terminal active service detection portion 14 detects that the portable terminal 4 is under servicing the navigation operation. Thus, the navigation operation by the portable terminal 4 can be transferred to the navigation device 3 to be executed continuously. If the user is listening to music by the portable terminal 4, the portable terminal active service detection portion 14 detects it so that the reproduction operation of the music is transferred to the navigation device 3 to be reproduced continuously. If the user is talking on the portable terminal 4, the portable terminal active service detection portion 14 detects it so that the telephone communication can be transferred to the handsfree device to be performed continuously. Thus, the services can be performed continuously without interruption by the cooperation between the navigation device 3 and the portable terminal 4 when the user walks from his or her home to a car in a parking lot, gets on the car, and walks to a customer after reaching a vicinity of a destination.

The cooperation managing portion 15 cooperates with the service of the portable terminal 4 detected by the available portable terminal service detection portion 13 and performs a process corresponding to the detected service on the navigation device 3 side.

More specifically, the cooperation managing portion 15 includes an address list cooperation portion 21, a schedule cooperation portion 22 and a navigation cooperation portion 23. The address list cooperation portion 21 receives data of an address list 101 from the portable terminal 4 and manages the same so as to perform a process corresponding to the address list 101. Thus, the navigation device 3 can deal with the same address list 101 that is stored in the portable terminal 4 by function of the address list cooperation portion 21. Similarly, the schedule cooperation portion 22 and the navigation cooperation portion 23 also receive data about a schedule 102 and the navigation 104 from the portable terminal 4 and manage the same so as to perform processes corresponding to the schedule 102 and the navigation 104, respectively.

The destination specifying portion 16 selects and specifies one of a plurality of candidates for setting a destination or a location on a path.

More specifically, as shown in FIG. 2, the destination specifying portion 16 includes a candidate location specifying information recording portion 41, a position specifying information obtaining portion 42, a selecting portion 43, a priority table 44, a priority rule 45 and a profile 46.

The candidate location specifying information recording portion 41 searches and extracts information for specifying a location that corresponds to one schedule item in a schedule list indicated in the schedule 102 such as a personal name, a company name, a section name, a place name, a station name, a postcode (ZIP code), a telephone number or a fax number from the address list 101, and records the extracted one or more pieces of information as candidate location specifying information KTJ. The position specifying information obtaining portion 42 obtains information for specifying a position on a map corresponding to each piece of candidate location specifying information KTJ as position specifying information TTJ.

The selecting portion 43 selects one piece of candidate location specifying information KTJ or position specifying information TTJ from one or more pieces of candidate location specifying information KTJ or position specifying information TTJ. When the selection is performed, the priority table 44, the priority rule 45, the profile 46 or the like is referred to. The priority table 44 records priorities of a plurality of candidate locations indicated by the candidate location specifying information KTJ.

The priority rule 45 records a rule for narrowing candidate locations by determining priorities of a plurality of candidate locations. If the priorities are determined depending on types of a destination, for example, the rule may be adopted that describes "if the obtained candidate locations are a store and a home, the store is given higher priority." Such a rule can be stored as a knowledge database or can be learned while the device is used.

The profile 46 records an address, a work place, a responsible region or the like of the driver (user).

Thus, if the candidate location specifying information recording portion 41 extracts a plurality of candidate locations, the selecting portion 43 selects one candidate location in various methods. Examples of the methods are as follows.

(1) The profile 46 is used for selecting one candidate location.

(2) A current place of the car or an estimated time of arrival is used for selecting one candidate location.

(3) Other methods may be used for selecting one candidate location.

More specific examples are as follows.

(4) A location that has the shortest distance from the current position is selected from a plurality of candidate locations.

(5) A location that has the shortset distance from a user' home is selected.

(6) A location that has the earliest estimated time of arrival from the current position is selected.

(7) A location is selected in accordance with priorities. The priorities are preset in the priority table 44, for example. Alternatively, priorities that are set in the address list 101 of the portable terminal 4 are used.

(8) A location is selected in accordance with the priority rule 45.

(9) A location is selected in accordance with past history data. For example, a location that was visited the latest is selected with the highest priority. Alternatively, a location that is most frequently visited destination is selected with the highest priority. Such history data or frequency data may be recorded and stored in a destination setting portion 20.

The path managing portion 17 manages path information. The path information includes one or more destinations, and at least positions of the destinations, an order of passing of the positions and staying period at the positions are recorded.

The path managing portion 17 includes the destination setting portion 20. The destination setting portion 20 sets a destination and locations on a path automatically in the navigation device 3. The address list cooperation portion 21, the schedule cooperation portion 22, the navigation cooperation portion 23 or the like may be used for the setting.

In addition, the path managing portion 17 includes a user setting portion 24 for the user to set a destination manually. The user setting portion 24 modifies position information on a map that is displayed by the display portion 31, for example, in accordance with the position specifying information TTJ that complies with a setting input by the user. On this occasion, it is possible to show the candidate locations extracted by the candidate location specifying information recording portion 41 to the user so that the user can select one of them. In addition, it is possible to guide the user to input information for specifying a destination position such as an address or a telephone number if there is no candidate location. It is possible that the user operates a pointing device to designate a position on the map directly. It is also possible to transmit items set by the user in the navigation device 3 to the portable terminal 4 so that the items can be reflected on the address list 101 of the portable terminal 4.

While a map and the selected position specifying information TTJ are displayed on a screen of the display portion 31, other position specifying information TTJ that was not selected may be displayed on the peripheral portion of the screen so that the user can select one of them. In addition, it is possible to display a message on the screen showing a selecting method that is used by the selecting portion 43 and a selecting method that was used, and to permit the user to select a selecting method. In addition, such a selecting method may be assigned with a priority in advance.

The interaction portion 18 performs interactive operation with the user so as to obtain user's intention, so the user can perform input by interaction. Therefore, if the destination specifying portion 16 cannot select one candidate location, or if there is no candidate location, for example, the interactive operation with the user enables to specify one candidate location. In addition, it is possible to select a method for the user to select one candidate location or to set priorities by the interactive operation.

The service portion 19 includes a navigation portion 25. The navigation portion 25 includes the display portion 31 and a database 32.

The display portion 31 is a display device that utilizes an LCD or the like, and it displays a map on the screen and position information on the map in accordance with the selected position specifying information or the like.

The database 32 stores data necessary for the navigation. For example, it stores information of longitudes and latitudes corresponding to information for specifying locations and buildings, which includes addresses, place names, postcodes (ZIP codes) and telephone numbers.

The portable terminal 4 is equipped with an on-vehicle terminal connection detection portion 51, a data transmission-reception portion 52, a cooperation managing portion 53, a service portion 54 and the like. The service portion 54 has functions that include the address list 101, the schedule 102, telephone communication 103, the navigation 104, electronic mail 105 and the like.

The on-vehicle terminal connection detection portion 51 detects whether or not the portable terminal 4 is connected to the navigation device 3. The data transmission-reception portion 52 performs transmission and reception of data with the navigation device 3 after the communication is established. The cooperation managing portion 53 manages information and processes concerning cooperation with the navigation device 3. In addition, it checks and manages services that are used by the portable terminal 4.

The service portion 54 has functions that include the address list 101, the schedule 102, the telephone communication 103, the navigation 104, the electronic mail 105 and the like.

The address list 101 usually records personal names, company names, section names, place names, postcodes (ZIP codes), telephone numbers, fax numbers, electronic mail addresses, memos and the like.

The schedule 102 usually records information about a location where the user will visit or wait. More specifically, it records information such as a personal name, a company name, a section name, a place name or a telephone number in connection with information about date and time of visit.

The telephone communication 103 is a service for enabling the portable terminal 4 to work as a cellular phone. The navigation 104 is a service for connecting the portable terminal 4 to a network via the cellular phone, so that the portable terminal 4 can work as a navigation device independently. The electronic mail 105 is a service for connecting to a network so as to transmit and receive electronic mail.

Next, an example of operation and action of the information cooperation system 1 will be described.

It is supposed that the user who carries the portable terminal 4 moves and approaches a car equipped with the navigation device 3 while the navigation device 3 and the portable terminal 4 are powered on and active. Thus, a communication connection is established between the navigation device 3 and the portable terminal 4. Once the connection is established, the available portable terminal service detection portion 13 of the navigation device 3 detects services available to the navigation device 3 among existing services in the service portion 54 of the portable terminal 4. For example, the address list 101 and the schedule 102 are detected, and the portable terminal active service detection portion 14 and the cooperation managing portion 15 are informed of the detection result.

The portable terminal active service detection portion 14 of the navigation device 3 detects services that are executed currently by the portable terminal 4 among those available services, and the cooperation managing portion 15 is informed of the detection result. Note that there is a case where no service is executed currently depending on a usage state of the portable terminal 4.

The cooperation managing portion 15 that was informed of the available services uses cooperation portions of the navigation device 3 corresponding to the services. For example, the address list cooperation portion 21 corresponding to the address list 101 and the schedule cooperation portion 22 corresponding to the schedule 102 are used so that the address list 101 and the schedule 102 become available. More specifically, the portable terminal 4 transmits the address list 101 and the schedule 102 so that the cooperation managing portion 15 can process them, for example. When these services become available to the cooperation managing portion 15, the destination setting portion 20 is informed of the fact.

The destination setting portion 20 obtains information (candidate location specifying information KTJ) for specifying a location of a destination such as a personal name or a company name and a time order of it concerning a schedule after the present time from the schedule 102 that was obtained from the portable terminal 4 via the schedule cooperation portion 22. On this occasion, the address list 101 that was obtained from the portable terminal 4 is referred to. Then, the obtained candidate location specifying information KTJ is sent to the destination specifying portion 16. It is possible that the destination setting portion 20 obtains the schedule 102 from the portable terminal 4 via the schedule cooperation portion 22 when cooperation with the portable terminal 4 becomes enabled.

The destination specifying portion 16 obtains information for specifying a position on the map corresponding to each piece of candidate location specifying information KTJ, which is information position specifying information TTJ, concerning the candidate location specifying information KTJ that was transmitted. When the position specifying information TTJ is obtained from the candidate location specifying information KTJ, the database 32 in the navigation portion 25 is used. In addition, information of the address list 101 is used if necessary. In this case, if there is a plurality pieces of candidate location specifying information KTJ for one schedule item, only one piece of the candidate location specifying information KTJ or position specifying information TTJ is selected. This selection process will be described later in detail.

After the destination specifying portion 16 obtains single piece of position specifying information TTJ for each schedule item, it is transmitted to the navigation portion 25 of the service portion 19 in accordance with an order obtained from the schedule 102. The navigation portion 25 sets a path from the current position to the final schedule position on a map in accordance with the position specifying information TTJ and its order.

Although the destination setting portion 20 obtains the candidate location specifying information KTJ from the schedule 102 as described above, it is possible instead to obtain only information for specifying a location of a destination such as a personal name and a company name among information recorded in the schedule 102, and to obtain the candidate location specifying information KTJ by the destination specifying portion 16. In this case, it is sufficient for the destination setting portion 20 to refer to only the schedule 102 without referring to the address list 101, while the destination specifying portion 16 may refer to the address list 101 to obtain the candidate location specifying information KTJ.

In addition, it is possible that the destination setting portion 20 sets a path in the navigation portion 25 and updates the schedule 102 so that the path information that is managed by the navigation device 3 can conform to the schedule information that is managed by the portable terminal 4. In this case, it is preferable to record information that was described in the schedule 102 also in the path information, so that the contents described in the first schedule can be rewritten without being lost when the schedule is rewritten. Further in this case, it is possible for the portable terminal connection detection portion 11 to detect disconnection between the cellular phone and the navigation device 3. It is also possible to delete path information in the path managing portion 17 and to delete information included in a candidate location list KTL, a position specifying list TTL, a position setting list TSL and the like, so that the navigation device 3 does not include remaining information concerning the schedule.

Next, an example of a process performed by the destination specifying portion 16 will be described with a concrete example.

Figure 3:
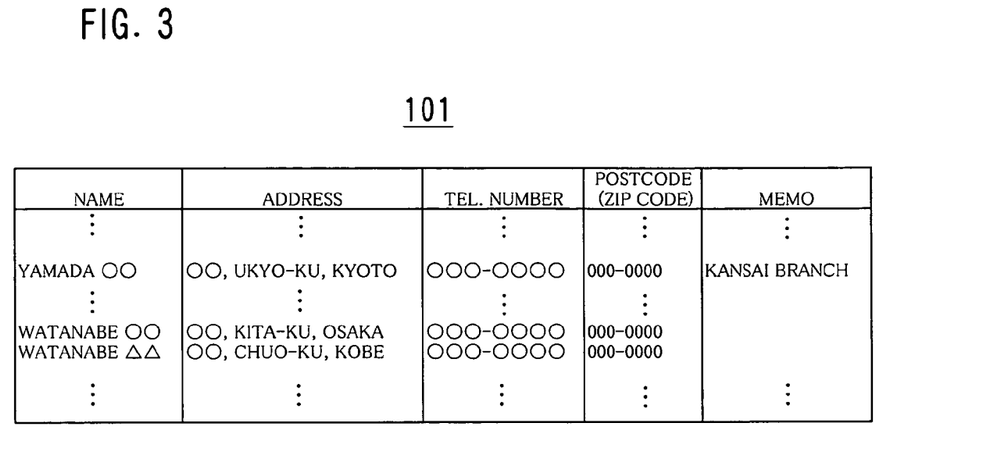
FIG. 3 is a diagram showing an example of an address list.
Figure 4:
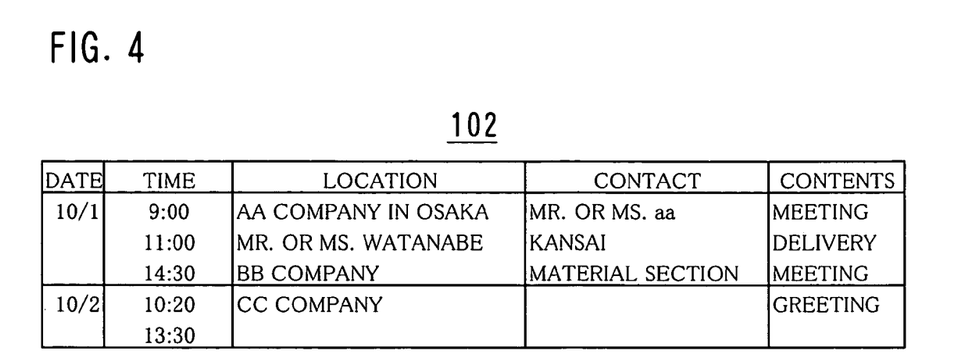
FIG. 4 is a diagram showing an example of a schedule list.
Figure 5:
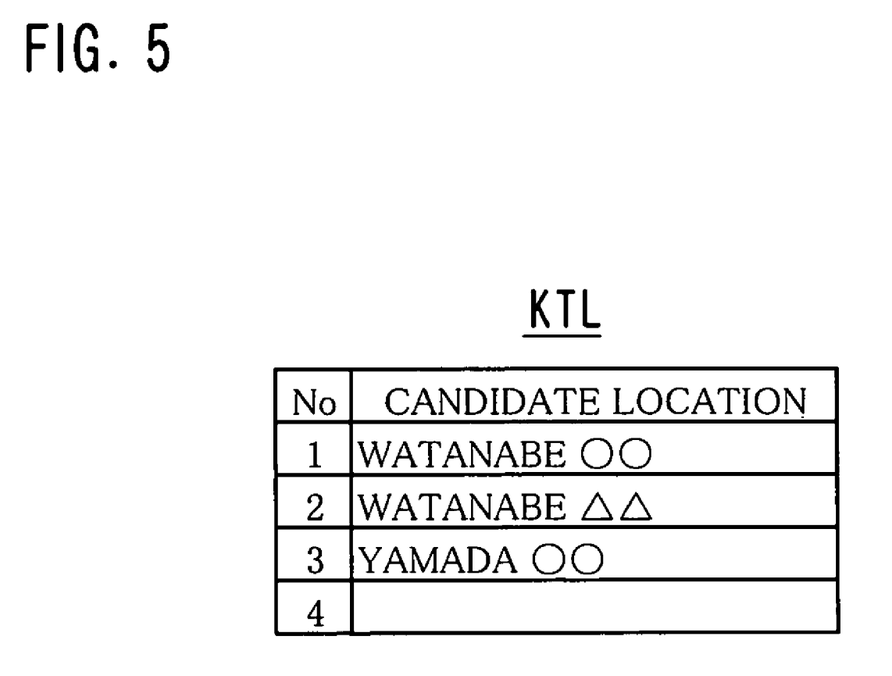
FIG. 5 is a diagram showing an example of a candidate location list.
Figure 6:
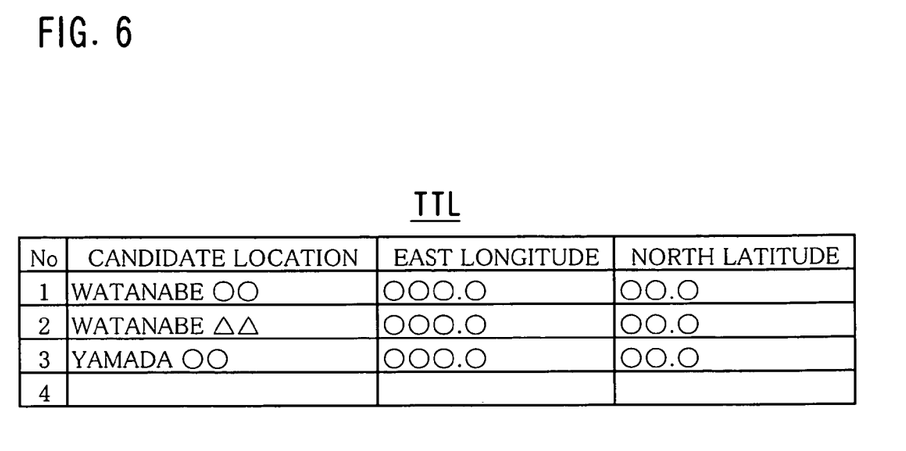
FIG. 6 is a diagram showing an example of a position specifying list.
Figure 7:
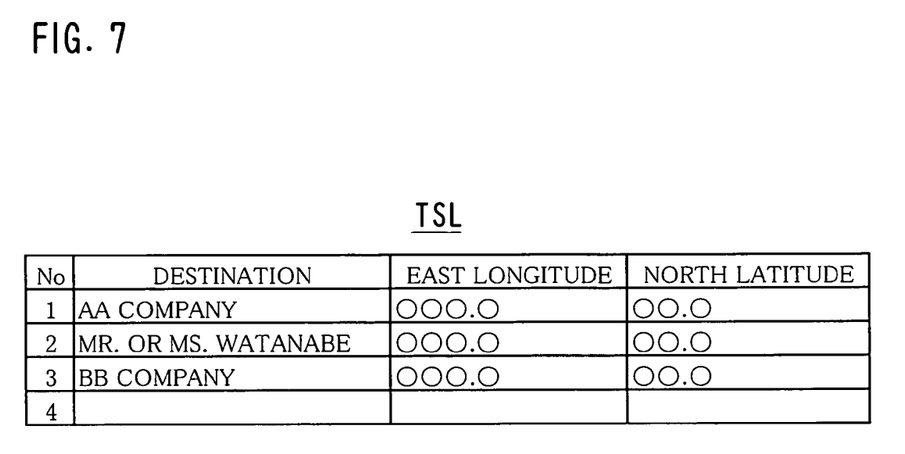
FIG. 7 is a diagram showing an example of a position setting list.

FIG. 3 is a diagram showing an example of the address list 101, FIG. 4 is a diagram showing an example of the schedule 102, FIG. 5 is a diagram showing an example of the candidate location list KTL, FIG. 6 is a diagram showing an example of the position specifying list TTL and FIG. 7 is a diagram showing an example of the position setting list TSL.

Supposing that today is the first of October in the morning, today's schedule is read out of the schedule 102 shown in FIG. 4, and information that indicates a destination is extracted from the schedule. In the example shown in FIG. 4, "Mr. or Ms. aa" of "AA company" in "Osaka" at 9:00, "Mr. or Ms. Watanabe" in "Kansai" at 11:00 and "Material section" of "BB company" at 14:30 are extracted.

In accordance with the above information, the candidate location specifying information recording portion 41 refers to the address list 101 shown in FIG. 3 so as to obtain candidate location specifying information KTJ of each schedule. It is supposed that a single piece of candidate location specifying information KTJ, e.g., an address of the "AA company" is obtained from the address list 101 for the schedule "Mr. or Ms. aa" of "AA company" in "Osaka" at 9:00. The position specifying information obtaining portion 42 refers to the database 32 in accordance with the address of the "AA company" and obtains latitude and longitude that are position specifying information TTJ corresponding to this address. The result of this is recorded in the first item of the position setting list TSL shown in FIG. 7. If the address is not known, latitude and longitude are obtained corresponding to a postcode (ZIP code), a telephone number or the like.

Next, concerning the schedule "Mr. or Ms. Watanabe" in "Kansai" at 11:00, three pieces of candidate location specifying information KTJ including "Watanabe ○○", "Watanabe ΔΔ" and "Yamada ○○" are obtained from the address list 101, corresponding to "Mr. or Ms. Watanabe" in "Kansai". More specifically, two names "Watanabe ○○" and "Watanabe ΔΔ" are obtained corresponding to "Mr. or Ms. Watanabe", and one name "Yamada ○○" is obtained corresponding to "Kansai". The result is the candidate location list KTL shown in FIG. 5.

Concerning the candidate location list KTL, the position specifying information TTJ of each candidate location is obtained by referring to the database 32. First, concerning "Watanabe ○○", latitude and longitude corresponding to its address are obtained. Similarly, concerning "Watanabe ΔΔ" and "Yamada ○○", latitudes and longitudes are obtained corresponding to their addresses. The result is the position specifying list TTL shown in FIG. 6. The position specifying list TTL shown in FIG. 6 can be provided by adding information to the candidate location list KTL shown in FIG. 5.

Next, the selecting portion 43 selects one candidate location among three candidate locations. For the selection, the priority table 44, the priority rule 45, the profile 46 or the like is referred to.

If the selection method (4) described above is used for selecting a location that has the shortest distance from the current position, for example, a distance between each candidate location and the current position is calculated first in accordance with the position specifying information TTJ of each candidate location and the current position (longitude and latitude) obtained by the GPS. The calculation can be performed easily from a difference of longitude and latitude between two positions. Then, candidate locations are sorted so that one having the shortest distance is listed at the top, in order of distance from shortest to longest, and a candidate location of the highest order is selected as a destination.

Alternatively, if the selection method (5) described above is used for selecting a location that has a short distance from a user' home, an address of the user's home is obtained first by referring to the profile 46, and longitude and latitude are obtained by referring to the database 32. Then, similarly to the case of the method (4), a distance between two positions is calculated.

Alternatively, if the selection method (6) described above is used for selecting a location that has the earliest estimated time of arrival from the current position, a path connecting each set of two positions is determined in accordance with the map information, and a necessary time of each path is calculated in accordance with a speed limit on a road of the path, a distance between them, a traffic on the road, the number of signals and the like. One candidate location that has the shortest necessary time is selected.

Alternatively, if the selection method (9) described above is used for selecting a location that was visited the latest, the candidate location that is set to be the latest destination is selected among three candidate locations in accordance with the history data stored in the destination setting portion 20.

Furthermore, other various methods can be used for selecting a candidate location. In addition, it is possible that the user modifies the selection of a candidate location or determines the selection method as described above.

In this example, "Watanabe ○○" is selected, and the result of it is recorded in the second item of the position setting list TSL shown in FIG. 7.

Next, concerning "Material section" of "BB Company" at 14:30, it is supposed that a single piece of candidate location specifying information KTJ, e.g., an address of the "BB Company" was obtained from the address list 101 corresponding to "Material section" of "BB Company". Latitude and longitude corresponding to this address are obtained, and the result is recorded in the third item of the position setting list TSL shown in FIG. 7.

The navigation portion 25 sets each position on a map in accordance with the obtained position setting list TSL, and the set positions are displayed on the map on the screen.

Next, a process performed by the destination specifying portion 16 will be described with reference to flowcharts.

Figure 8:
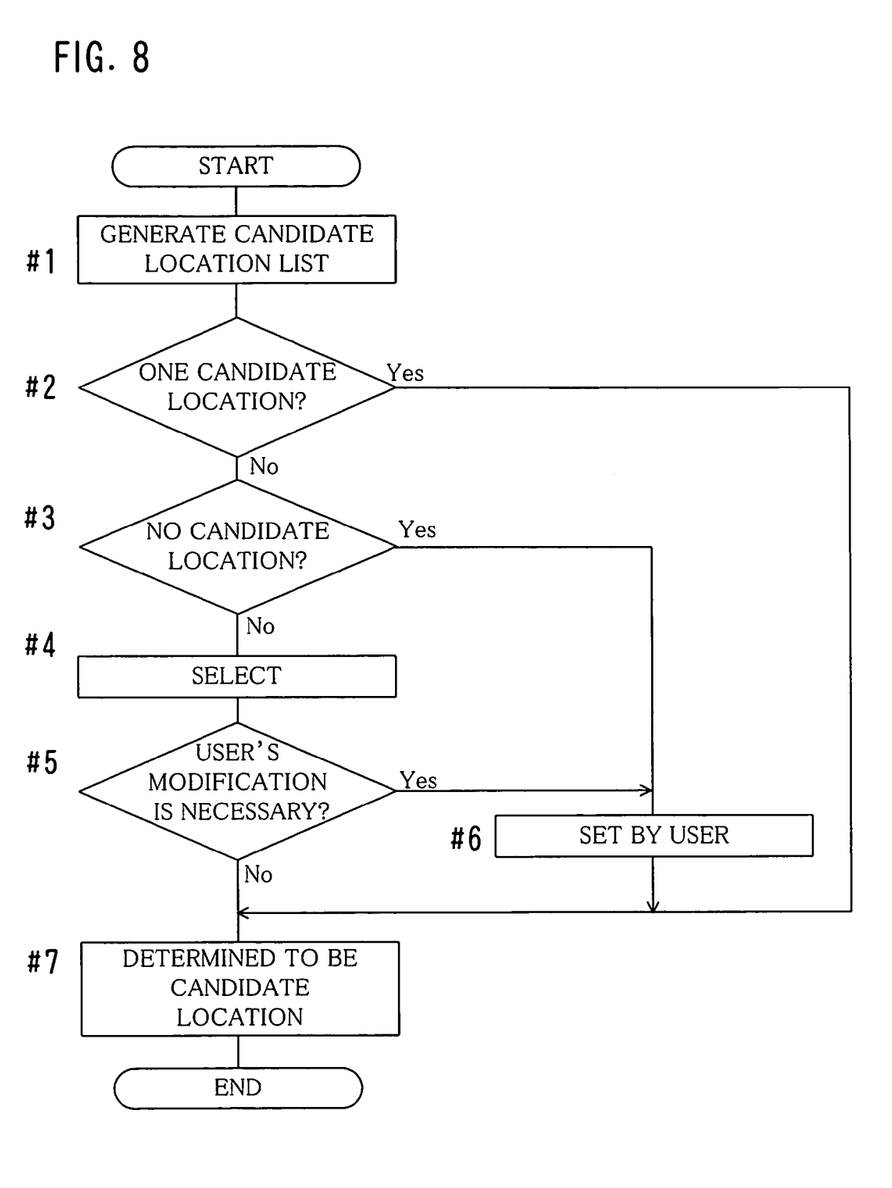
FIG. 8 is a flowchart showing a process for obtaining position specifying information.
Figure 9:
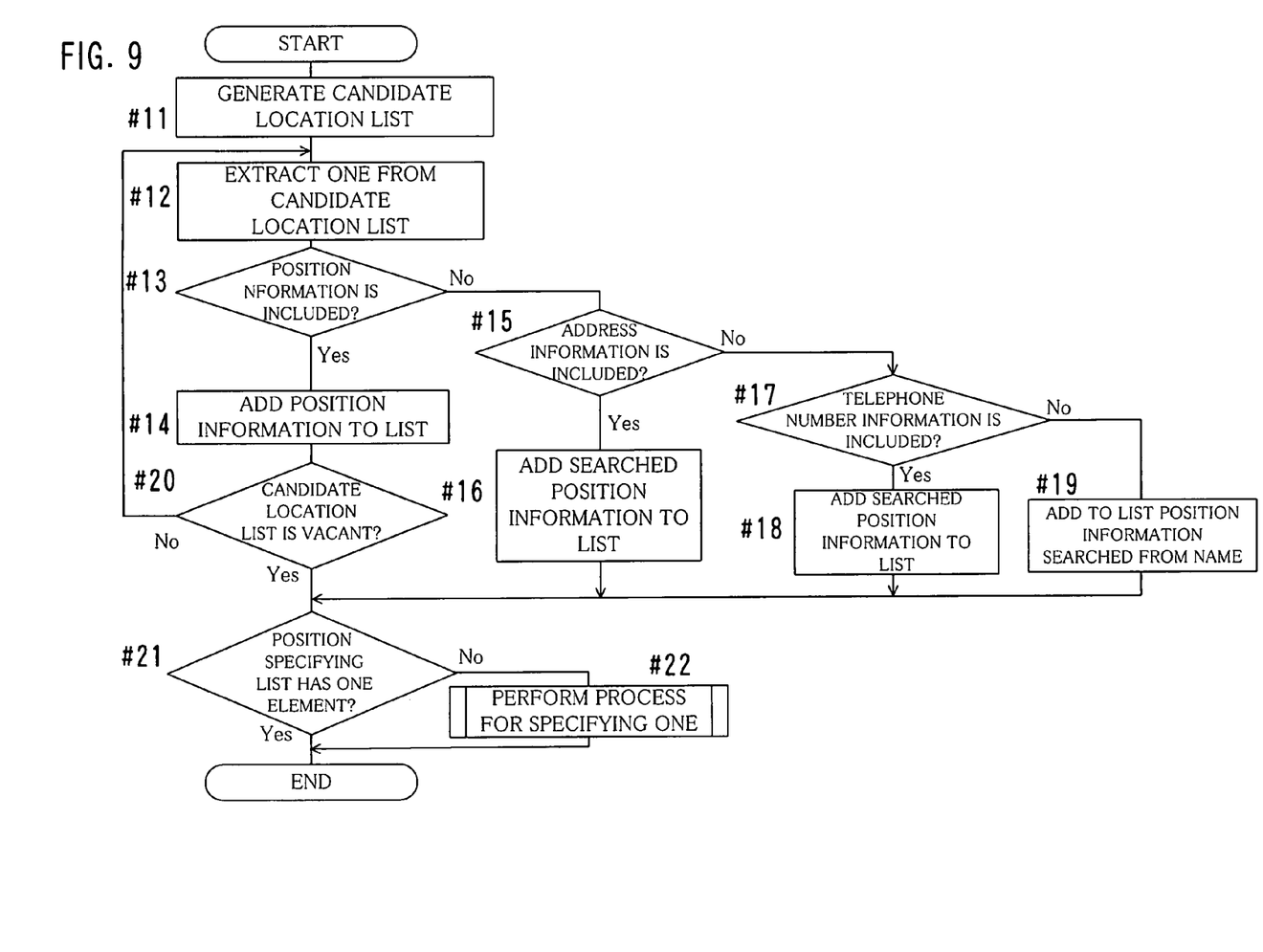
FIG. 9 is a flowchart showing another example of the process for obtaining position specifying information.
Figure 10:
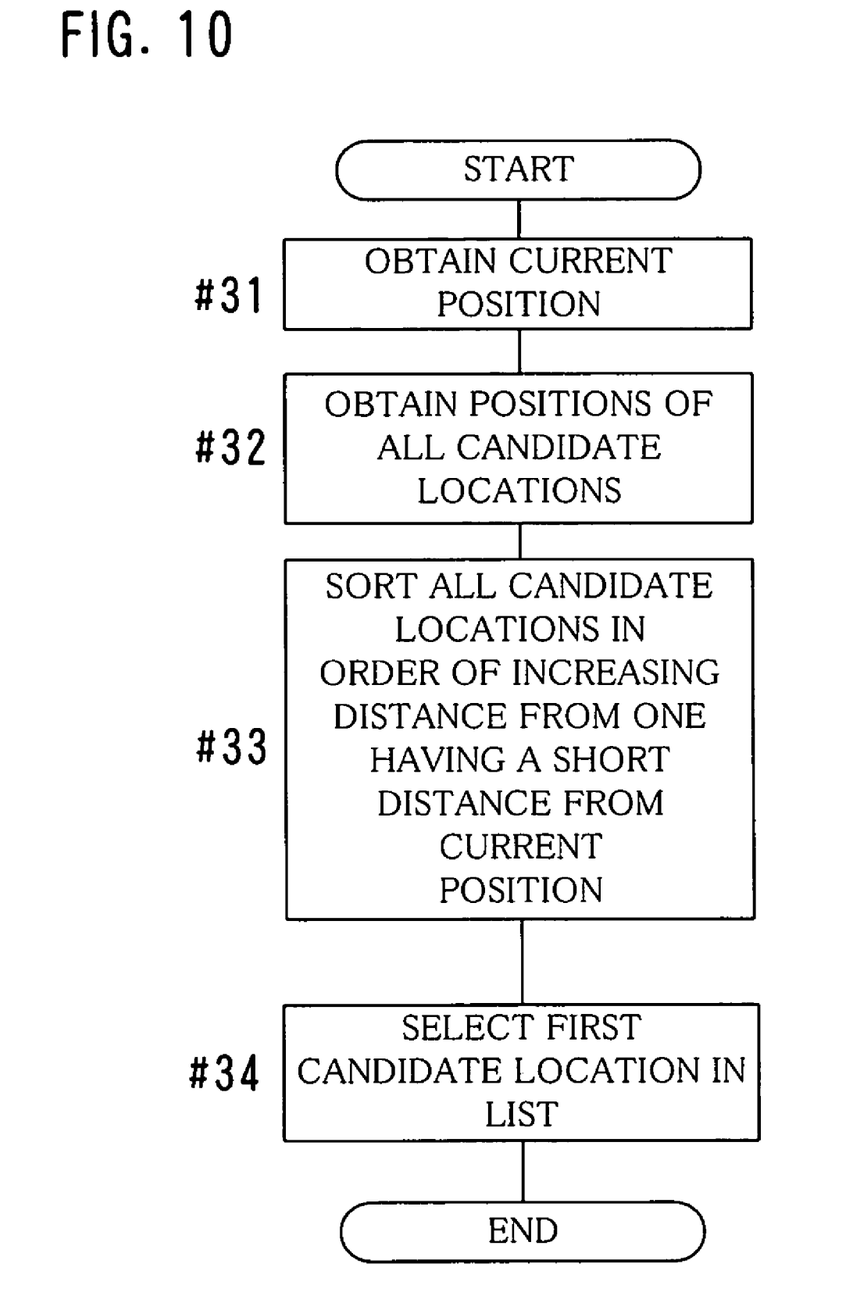
FIG. 10 is a flowchart showing an example of a selection process.
Figure 11:
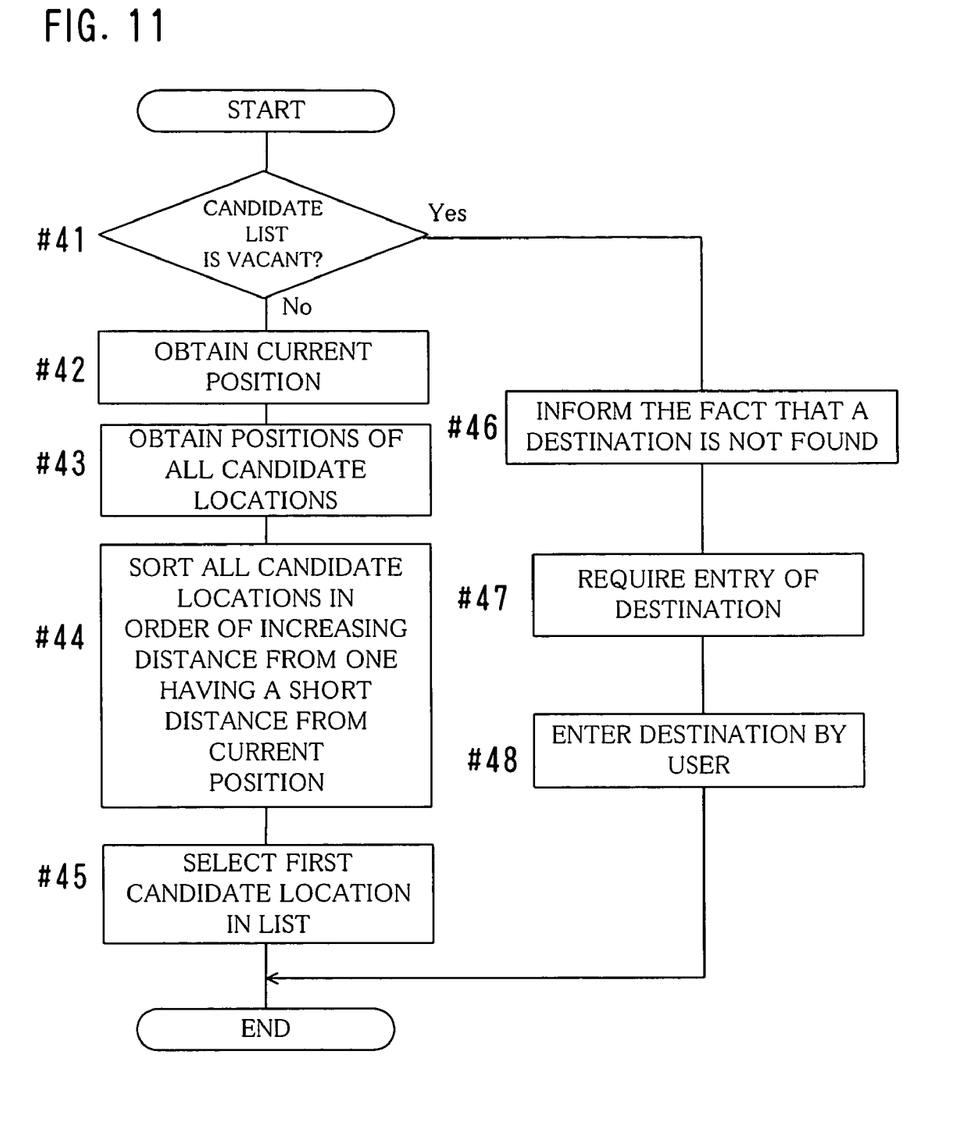
FIG. 11 is a flowchart showing another example of the selection process.

FIG. 8 is a flowchart showing a process for obtaining position specifying information, FIG. 9 is a flowchart showing another example of the process for obtaining position specifying information, FIG. 10 is a flowchart showing an example of a selection process, and FIG. 11 is a flowchart showing another example of the selection process.

As shown in FIG. 8, the candidate location list KTL is generated (#1). If there is a single element recorded in the candidate location list KTL (Yes in #2), the single element is determined to be the candidate location (#7). If there is no element (Yes in #3), the user sets or determines the candidate location (#6). If there is a plurality of elements (No in #2 and #3), one of them is selected (#4). If a user's modification is necessary (Yes in #5), the user sets or determines the candidate location (#6).

As shown in FIG. 9, the candidate location list KTL is generated first (#11). One of elements recorded in the candidate location list KTL is extracted from the top in order (#12). It is checked whether or not the extracted candidate location includes position specifying information TTJ (#13). If the result in the step #13 is "Yes", the position specifying information TTJ is recorded in the position specifying list TTL (#14). In the steps #13 and #14, if latitude and longitude can be obtained from the cellular phone or the like by utilizing the GPS, for example, the result is used as the position specifying information TTJ without a modification.

If the result in the step #13 is "No" and there is address information (Yes in #15), the position specifying information TTJ is searched from the address information, and the result is recorded in the position specifying list TTL (#16). If the result in the step #15 is "No" and there is telephone number information (Yes in #17), the position specifying information TTJ is searched from the telephone number information, and the result is recorded in the position specifying list TTL (#18). If the result in the step #17 is "No", the position specifying information TTJ is searched from names, and the result is recorded in the position specifying list TTL (#19).

The process is repeated until the entire process is finished for the candidate location list KTL generated in the step #11 (#20). After that, if there is a single element in the position specifying list TTL (Yes in #21), one piece of position specifying information TTJ thereof is used. If there is a plurality of elements of the position specifying list TTL (No in #21), one of them is selected (#22).

As shown in FIG. 10, a current position is obtained by the GPS (#31). The position specifying information TTJ of each candidate location is extracted from the position specifying list TTL (#32). A distance between the current position and a position specified in each piece of the position specifying information TTJ is calculated, and the position specifying information TTJ is sorted in order of increasing distance from one having a short distance (#33). The first candidate location in the sorted position specifying list TTL is selected (#34).

As shown in FIG. 11, if the candidate location list KTL is not vacant (No in #41), a current position is obtained by the GPS (#42). The position specifying information TTJ of each candidate location is extracted from the position specifying list TTL (#43). A distance between the current position and a position specified in each piece of the position specifying information TTJ is calculated, and the position specifying information TTJ is sorted in order of increasing distance from one having a short distance (#44). The first candidate location in the sorted position specifying list TTL is selected (#45). If the candidate location list KTL is vacant (Yes in #41), the destination setting portion 20 is informed of the fact that a destination is not found (#46). The user setting portion 24 of the destination setting portion 20 requires the user to enter a destination (#47). This is performed by displaying a message showing the requirement on the screen of the display portion 31 or outputting a voice message, for example. The user enters a destination responding to the message.

The input or setting by the user is performed as an operation of an operation panel or the like by the user or an interaction between the user and the navigation device 3 using voices. For example, the user designates a position of a destination directly by using a touch panel on the screen, enters the position specifying information TTJ by operating the operation panel, enters an address or the like, or instructs in accordance with a search input screen that is prepared in the navigation portion 25.

Figure 12:
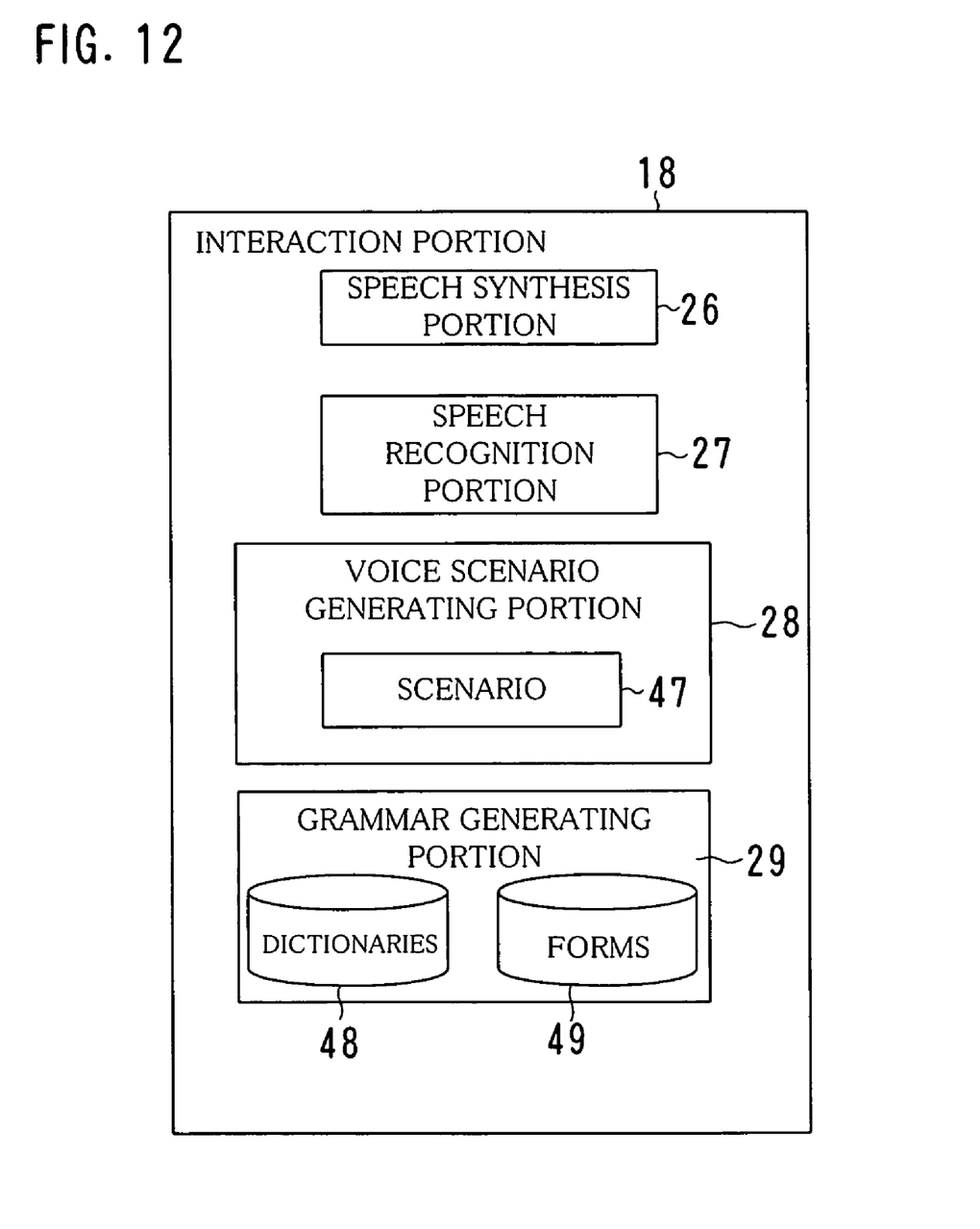
FIG. 12 is a block diagram showing an example of an interaction portion.

Next, a structure of the interaction portion 18 will be described.

FIG. 12 is a block diagram showing an example of the interaction portion 18.

As shown in FIG. 12, the interaction portion 18 includes a speech synthesis portion 26, a speech recognition portion 27, a voice scenario generating portion 28 and a grammar generating portion 29. The voice scenario generating portion 28 stores a generated scenario 47. The grammar generating portion 29 is provided with dictionaries 48, forms 49 and the like.

The speech synthesis portion 26 synthesizes a speech in accordance with the scenario 47 and outputs the speech from a speaker (not shown). The speech recognition portion 27 recognizes a voice signal that was entered from a microphone (not shown). For the recognition, the dictionary 48 and the form 49 are referred. The dictionary 48 registers phrases that were recorded in the address list 101, the schedule 102 or the like that were used by the cooperation managing portion 15. The speech recognition is performed in accordance with these registered phrases. The voice scenario generating portion 28 generates the scenario 47 so that the selection or setting of the candidate location, modification of the position specifying information TTJ, or operation or action of other navigation device 3 or portable terminal 4 is performed in accordance with the embodiment described above. For generating the scenario 47, the candidate location specifying information KTJ, the position specifying information TTJ or the like is used. The scenario 47 may be various sentences including, for example, "Do you set today's schedule ○○ to be a destination?", "Do you set the destination ○○ in the cellular phone to the on-vehicle device?", "Select a method for selecting a candidate location", "Do you change a priority for selecting a candidate location?" and "Designate the first priority". Thus, the interaction portion 18 performs an interactive operation with the user so as to obtain a user's intention.

According to the embodiment described above, even if there is a plurality pieces of candidate location specifying information KTJ or position specifying information TTJ for specifying a destination position, one piece of candidate location specifying information KTJ or position specifying information TTJ can be selected automatically and appropriately among them, and position information can be displayed on a map in accordance with the selected information. If the position specifying information TTJ selected automatically is not suitable for the user, the user can modify it so as to select a piece of position specifying information TTJ that is necessary for the user as a result. In addition, even if there is no candidate location specifying information KTJ, the user can set one, and appropriate position information is displayed. When the user sets or selects it, various information concerning it is displayed on the screen or produced as a speech output, so that the user can refer to the information for the setting appropriately and promptly.

In the embodiment described above, if there is a plurality pieces of candidate location specifying information KTJ or position specifying information TTJ, the selecting portion 43 may select one of them for narrowing the information. The address list 101 and the schedule 102 may include various formats having various items.

Although the destination specifying portion 16, the destination setting portion 20 and the like are provided independently of the navigation portion 25 in the embodiment described above, it is possible to adopt a structure in which the destination specifying portion 16, the destination setting portion 20 and the like are provided inside the navigation portion 25. The structure may be modified variously.

Although the portable terminal 4 is provided with the address list 101 in the embodiment described above, it is possible to provide another address list independently in the navigation device 3. In this case, concerning searching and extraction of the candidate location specifying information KTJ from the address list data, priority may be determined for which address list of the navigation device 3 or the portable terminal 4 should be given higher priority.

In the embodiment described above, structures, process contents, process orders and the like of the destination specifying portion 16 and the destination setting portion 20 may be modified variously besides the above-mentioned way. The destination specifying portion 16 and the destination setting portion 20 are not necessarily separated from each other. Furthermore, a structure, the number and process contents or orders of the entire or each part of the navigation device 3, the portable terminal 4 or the information cooperation system 1, display contents on the screen, output speech contents and the like can be modified if necessary in accordance with the spirit of the present invention.

While example embodiments of the present invention have been shown and described, it will be understood that the present invention is not limited thereto, and that various changes and modifications may be made by those skilled in the art without departing from the scope of the invention as set forth in the appended claims and their equivalents.

What is claimed is:

1. A navigation device that is capable of managing path information, the device comprising:
   a data transmission-reception portion sending data to a portable terminal, and receiving data from the portable terminal;
   an address list cooperation portion receiving address list data from the portable terminal and managing the received address list data;
   a schedule cooperation portion receiving schedule data from the portable terminal and managing the received schedule data;
   a candidate location specifying information recording portion searching and extracting, from the address list data, one or more pieces of candidate location information specifying a location corresponding to a schedule item contained in the schedule data and recording the extracted one or more pieces of candidate location specifying information;
   a position specifying information obtaining portion obtaining one or more of pieces of position specifying information that specifies a position of a destination or a location on a path that corresponds to each piece of the recorded one or more pieces of candidate location specifying information;
   a selecting portion selecting one piece of position specifying information from among the obtained one or more pieces of position specifying information; and
   a path managing portion determining the position of the destination or the location on the path in accordance with the selected one piece of position specifying information and managing the path information.

2. The navigation device according to claim 1, further comprising a position information modifying portion modifying each piece of the position information of the destination or the location on the path that is managed by the path managing portion in accordance with position specifying information that was not selected by the selecting portion.

3. The navigation device according to claim 1, further comprising a user setting portion modifying each piece of the position information of the destination or the location on the path that is managed by the path managing portion in accordance with position specifying information that complies with a setting input by a user.

4. The navigation device according to claim 1, wherein the selecting portion calculates a distance between a current position and each position in accordance with each piece of position specifying information and selects position specifying information having a calculated distance that is the smallest.

5. The navigation device according to claim 1, wherein the selecting portion calculates a time that is necessary for traveling from a current position to each position in accordance with each piece of position specifying information and selects position specifying information having a calculated time that is the shortest.

6. The navigation device according to claim 1, wherein the selecting portion calculates a distance between user's home and each position in accordance with each piece of position specifying information and selects position specifying information having a calculated distance that is the smallest.

7. The navigation device according to claim 1, wherein the selecting portion selects one piece of position specifying information from among the position specifying information in accordance with a preset priority.

8. The navigation device according to claim 1, wherein the selecting portion selects one piece of position specifying information from among the position specifying information in accordance with past history data.

9. The navigation device according to claim 1, wherein the selecting portion performs a conversation with a user using voice about each piece of position specifying information and selects position specifying information in accordance with contents of the conversation.

10. A program, stored on a computer readable medium, for a navigation device, said program causing a computer to execute:
    sending data to a portable terminal, and receiving data from the portable terminal;
    receiving address list data from the portable terminal and managing the received address list data;
    receiving schedule data from the portable terminal and managing the received schedule data;
    extracting, from the address list data, one or more pieces of candidate location specifying information that specifies a location corresponding to a schedule item contained in the schedule data and recording the extracted one or more pieces of candidate location specifying information;
    obtaining one or more pieces of position specifying information that specifies a position of a destination or a location on a path that corresponds to each piece of the recorded one or more pieces of candidate location specifying information;
    selecting one piece of position specifying information from among the obtained one or more pieces of position specifying information; and
    determining the position of the destination or the location on the path in accordance with the selected one piece of position specifying information and managing the path information.

11. A method for use in a navigation device, comprising:
    sending data to a portable terminal and receiving data from the portable terminal;
    receiving address list data from the portable terminal and managing the received address list data;
    receiving schedule data from the portable terminal and managing the received schedule data;
    extracting, from the address list data, one or more pieces of candidate location specifying information that specifies a location corresponding to a schedule item contained in the schedule data, and recording the extracted one or more pieces of candidate location specifying information;
    obtaining one or more pieces of position specifying information that specifies a position of a destination or a location on a path that corresponds to each piece of the recorded one or more pieces of candidate location specifying information;
    selecting one piece of position specifying information from among the obtained one or more pieces of position specifying information; and
    determining the position of the destination or the location on the path in accordance with the selected one piece of position specifying information and managing the path information.

* * * * *